United States Patent
Mau

(10) Patent No.: US 7,909,509 B2
(45) Date of Patent: Mar. 22, 2011

(54) SENSOR CONFIGURATION FOR TEMPERATURE MEASUREMENT

(75) Inventor: Gert Mau, Aildingen (DE)

(73) Assignee: Sitronic Ges. fuer Elektrotechnische Ausruestung mbH & Co. KG, Gaertingen (DE)

( * ) Notice: Subject to any disclaimer, the term of this patent is extended or adjusted under 35 U.S.C. 154(b) by 348 days.

(21) Appl. No.: 12/004,206

(22) Filed: Dec. 20, 2007

(65) Prior Publication Data

US 2008/0212645 A1 Sep. 4, 2008

(30) Foreign Application Priority Data

Dec. 22, 2006 (DE) .......................... 10 2006 062 115

(51) Int. Cl.
*G01K 1/14* (2006.01)
*G01K 7/00* (2006.01)

(52) U.S. Cl. ........ 374/170; 374/208; 374/141; 702/130; 324/500

(58) Field of Classification Search ................ 374/100, 374/141, 208, 163, 170, 178, 179, 183, 185, 374/147, 152; 338/28, 22 R, 25; 702/130–136; 73/866.5; 313/509; 361/681; 445/3; 428/1.5; 349/190; 324/500, 750, 763, 770, 760, 758–759
See application file for complete search history.

(56) References Cited

U.S. PATENT DOCUMENTS

| | | | | |
|---|---|---|---|---|
| 4,165,995 A | * | 8/1979 | Kolb | 136/234 |
| 4,524,778 A | * | 6/1985 | Brown et al. | 600/549 |
| 4,708,020 A | * | 11/1987 | Lau et al. | 73/852 |
| 5,492,482 A | * | 2/1996 | Lockman et al. | 439/329 |
| 5,527,111 A | * | 6/1996 | Lysen et al. | 374/208 |
| 5,620,255 A | * | 4/1997 | Cook, III | 374/141 |
| 6,048,095 A | * | 4/2000 | Shindo et al. | 374/208 |
| 6,077,228 A | * | 6/2000 | Schonberger | 600/549 |
| 6,193,414 B1 | * | 2/2001 | Balzano | 374/208 |
| 6,257,758 B1 | | 7/2001 | Culbertson | |
| 6,431,459 B1 | * | 8/2002 | Humburg | 237/2 A |
| 6,504,392 B2 | * | 1/2003 | Fredeman et al. | 324/760 |
| 6,572,265 B1 | | 6/2003 | Gotthold et al. | |
| 7,213,960 B2 | * | 5/2007 | Yoo | 362/634 |
| 7,234,863 B2 | * | 6/2007 | Yu | 374/141 |
| 7,416,332 B2 | * | 8/2008 | Rountree et al. | 374/152 |
| 7,465,088 B2 | * | 12/2008 | Garcia et al. | 374/153 |
| 7,703,978 B2 | * | 4/2010 | Jankowski et al. | 374/208 |
| 2003/0223474 A1 | | 12/2003 | Roepke | |
| 2005/0178200 A1 | | 8/2005 | Stauss et al. | |
| 2010/0040112 A1 | * | 2/2010 | Huck et al. | 374/183 |

FOREIGN PATENT DOCUMENTS

| | | | |
|---|---|---|---|
| DE | 10227454 A1 | 5/2003 | |
| DE | 102 14 368 A1 | 10/2003 | |
| DE | 699 07 493 T2 | 3/2004 | |
| DE | 10 2005 016 896 B3 | 10/2006 | |
| DE | 102006057339 A1 | * | 7/2007 |

(Continued)

*Primary Examiner* — Gail Verbitsky
(74) *Attorney, Agent, or Firm* — Walter A. Hackler

(57) ABSTRACT

A sensor configuration (1) for measuring the temperature of a surface, in particular of a screen (2), comprises a temperature sensor (3) which is disposed on a circuit board (4) and is positioned in the area of a front face (4') of the circuit board (4) in the vicinity of the surface to be measured, and a further circuit board (6). The circuit boards (4) and (6) are connected by means of at least two connecting elements (5), at least one of which is designed in a resilient fashion.

4 Claims, 1 Drawing Sheet

FOREIGN PATENT DOCUMENTS

| | | | |
|---|---|---|---|
| EP | 0305027 A2 * | 3/1989 |
| EP | 1077366 A2 * | 2/2001 |
| GB | 1 028 596 A | 5/1966 |
| GB | 1 379 888 A | 1/1975 |
| GB | 2036966 A * | 7/1980 |
| JP | 09-210802 | 8/1997 |
| JP | 2002006289 A * | 1/2002 |
| WO | WO 2006/108367 A | 10/2006 |
| WO | WO 2006/108367 A1 | 10/2006 |

* cited by examiner

SENSOR CONFIGURATION FOR TEMPERATURE MEASUREMENT

The invention relates to a sensor configuration for measuring the temperature of a surface.

There are different conventional sensor configurations of this type, preferably for measuring the temperature of approximately planar surfaces.

DE 699 07 493 T2 discloses a surface temperature sensor, wherein a heat conducting surface contact part is pressed against the surface to be measured by means of a spring. The surface contact part contains a temperature sensor which is disposed such that it is electrically isolated.

DE 102 27 454 A1 discloses a contact temperature sensor, wherein a contact part is connected to the surface to be measured in a heat conducting fashion by means of a heat conducting foil and heat conducting paste. A temperature sensor is coupled to the contact part by means of a further heat conducting foil.

DE 10 2005 016 896 discloses mounting of a flexible heat conducting element between the surface and the circuit board in a sensor configuration for measuring the temperature of a surface with a temperature sensor which is disposed on a circuit board and is positioned at a front face of the circuit board in the direct vicinity of the surface.

It is the underlying purpose of the invention to provide an inexpensive sensor configuration which enables detection of the temperature of an approximately flat surface, in particular, of a disc.

SUMMARY OF THE INVENTION

This object is achieved in accordance with the invention by the sensor configuration of claim 1. The dependent claims represent preferred embodiments of the invention.

The inventive sensor configuration for measuring the temperature of a surface comprises a circuit board onto which at least one temperature sensor is mounted, a further circuit board on which an electric or electronic circuit is provided, and at least two connecting elements between the circuit boards. At least one of the connecting elements is resilient. The structure is mounted relative to the surface to be measured, such that a front face of the first circuit board contacts the surface, which results in that heat can flow from the surface to be measured to the temperature sensor.

In a particularly preferred embodiment, the front face of the circuit board, which contacts the surface to be measured, is metallized.

In a preferred embodiment, the metallization of the front face is connected to a metallization on the upper side and/or lower side of the circuit board. This metallization extends, in turn, to the direct vicinity of the temperature sensor, or contacts or surrounds it.

The front face of the circuit board preferably has a surface which is smooth and rounded at least at the edges, which enables sliding displacement or turning of the sensor configuration along the surface to be measured. This is advantageous, in particular, for installation or removal of the sensor configuration, e.g. when the sensor configuration is mounted using a bayonet joint.

The connecting elements between the circuit boards are preferably metallic springs, in particular steel or bronze springs, which ensure that the first circuit board is reliably pressed to the surface.

The connecting elements preferably have a surface which is good to solder.

The circuit boards comprise recesses, preferably in the area of the resilient connecting elements, which at least partially surround the connecting elements. These recesses are preferably at least partially metallized.

In a preferred further development, the recesses of the circuit boards are constructed in such a fashion that the ends of the resilient connecting elements abut the circuit board, and the forces act on the contact surface perpendicularly to the surface to be measured.

In a preferred further development, the recesses of the circuit boards are constructed such that the ends of the resilient connecting elements on the circuit board are spaced apart from the perpendicular walls of the recess. This gap is filled during assembly, in particular, with solder tin.

In a preferred further development, the two circuit boards are rigidly connected to each other by bars made of the same material as the circuit boards prior to assembly. These bars are separated in one work step after assembly of the connecting elements.

In another advantageous further development, a further temperature sensor is provided on the second circuit board not in the direct vicinity of the surface to be measured, which determines by approximation the temperature of the sensor housing or of the interior.

In another particularly advantageous further development, the measured value of the temperature sensor, which is located in the direct vicinity of the surface to be measured and the measured value of which corresponds to the temperature of the surface to be measured, is corrected with the measured value of the second temperature sensor. The final heat conductance value of the circuit board and of the connecting elements can thereby be compensated for.

In a further preferred embodiment, further sensors, in particular, temperature sensors, humidity sensors or light sensors, are mounted to one of the circuit boards. In this case, the circuit board is preferably mounted in the interior of a vehicle and measures the temperature of the front screen. Towards this end, it can preferably be integrated in a rear mirror foot as housing. By simultaneously measuring the temperature of the screen surface, of the interior and the air humidity using the corresponding sensors, the sensor configuration can be used e.g. to measure fogging-up of the screen.

BRIEF DESCRIPTION OF THE DRAWINGS

Further advantages can be extracted from the description and the drawings. The features mentioned above and below may be used individually or in combination. The mentioned embodiments are not to be understood as exhaustive enumeration but have exemplary character.

One embodiment of the invention is shown in the schematic drawing and is explained in more detail below with reference to the figures of the drawing.

DETAILED DESCRIPTION

Figure 1:
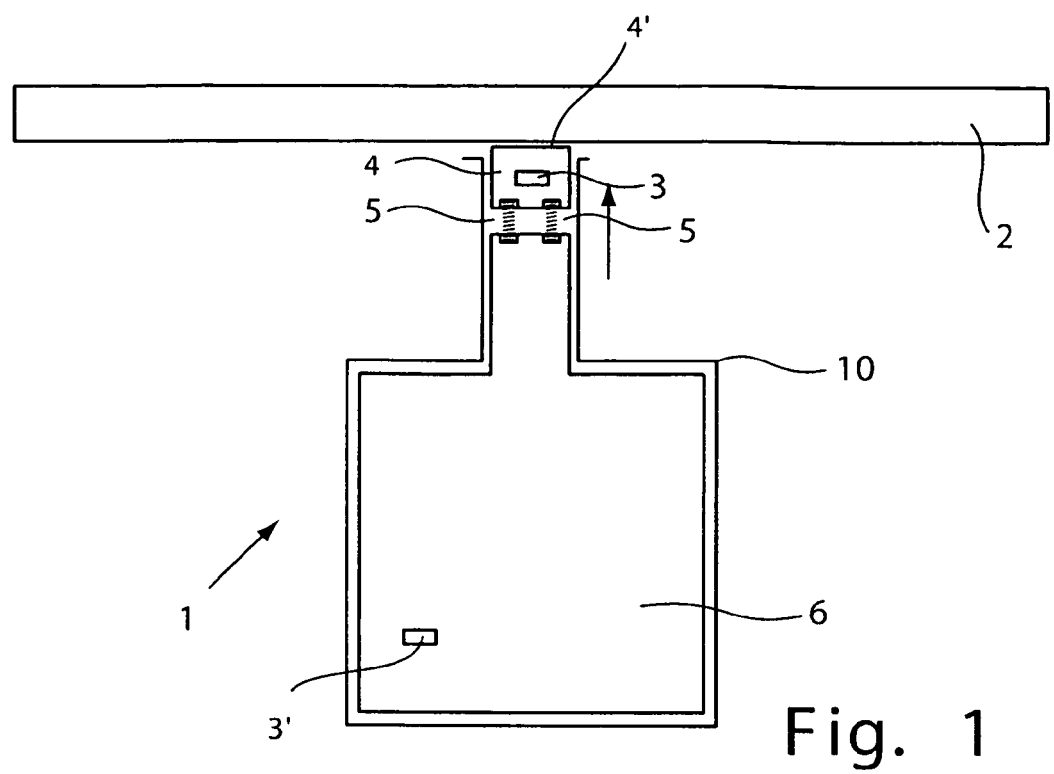
FIG. 1 shows a top view of a sensor configuration.

FIG. 1 shows a sensor configuration 1 for measuring the temperature on an almost planar surface formed by the front screen 2 of a vehicle. The sensor configuration 1 has a temperature sensor 3 which is disposed on a circuit board 4 in the direct vicinity of a front face 4' of the circuit board 4. The front face 4' is metallized and extends parallel to the surface of the front screen 2. The circuit board 4 is connected to a second circuit board 6 via resilient elements 5 and 5'. The sensor configuration 1 is surrounded by a housing 10 which protects the sensor configuration and has a leading function for the circuit board 4.

Figure 2:
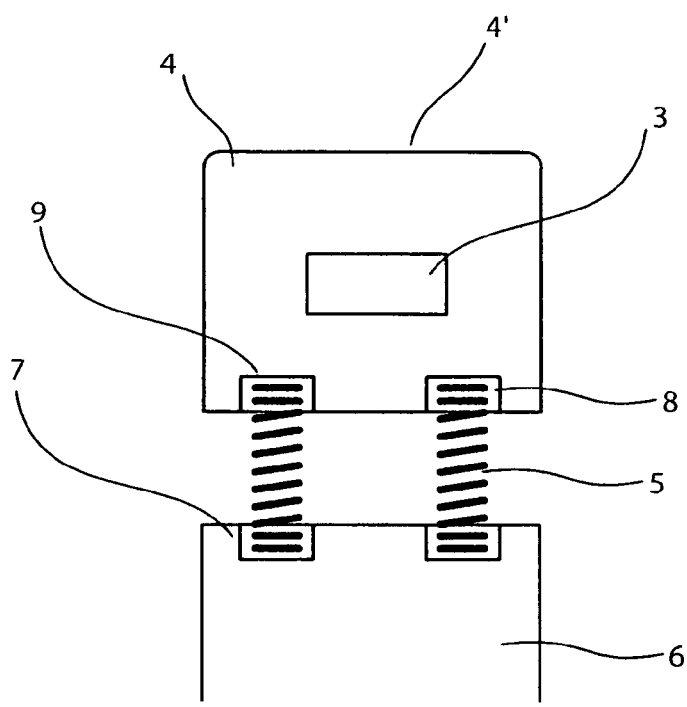
FIG. 2 shows a detailed view of the sensor configuration.

FIG. 2 shows a detailed view of the connection between the circuit boards 4 and 6. Recesses 7 are provided on the respectively opposite sides of the circuit boards 4 and 6, which receive the resilient elements 5. The gap between the resilient elements 5 and the walls 8 of the recesses 7 that take up the force exerted by the resilient elements is filled with solder tin 9, such that the forces act onto the soldering joints only in a perpendicular direction.

Further sensors and an evaluation unit may be mounted to the circuit boards 4 and 6. The further sensors may comprise a temperature sensor 3' for measuring the temperature of the interior and an air humidity sensor. The two further sensors may be used, together with the temperature sensor, for measuring the surface temperature in order to determine the fogging-up tendency of the front screen.

What is claimed is:

1. Sensor configuration (1) for measuring the temperature of a surface of a screen (2), with a temperature sensor (3) which is disposed on a first circuit board (4) and is positioned in the area of a front face (4') of the first circuit board (4) in the vicinity of the surface to be measured, and a second circuit board (6), wherein the first and second circuit boards (4) and (6) are connected by a resilient connecting element (5), for pressing the first circuit board front face (4') against the screen (2).

2. Sensor configuration according to claim 1 wherein the front face (4') of the first circuit board (4) is smooth and at least partially metallized.

3. Sensor configuration according to claim 1 wherein the connecting element (5) is a metallic spring.

4. Sensor configuration according to claim 1 wherein the circuit boards (4) and (6) have recesses at least partially surrounding corresponding connecting elements.

* * * * *